US011352456B2

(12) United States Patent
Gerrits et al.

(10) Patent No.: US 11,352,456 B2
(45) Date of Patent: Jun. 7, 2022

(54) POLYMER FOR PRODUCTION OF BI-DIRECTIONALLY ORIENTED FILMS

(71) Applicant: SABIC GLOBAL TECHNOLOGIES B.V., Bergen op Zoom (NL)

(72) Inventors: Niclasina Siberta Johanna Alberdina Gerrits, Geleen (NL); Attilio Scala, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/251,006

(22) PCT Filed: Jun. 28, 2019

(86) PCT No.: PCT/EP2019/067327
§ 371 (c)(1),
(2) Date: Dec. 10, 2020

(87) PCT Pub. No.: WO2019/207172
PCT Pub. Date: Oct. 31, 2019

(65) Prior Publication Data
US 2021/0253759 A1    Aug. 19, 2021

(30) Foreign Application Priority Data
Jul. 4, 2018  (EP) .................................. 18181656

(51) Int. Cl.
| | |
|---|---|
| *B32B 27/02* | (2006.01) |
| *C08F 210/16* | (2006.01) |
| *B29C 48/08* | (2019.01) |
| *B29C 48/00* | (2019.01) |
| *B29C 55/14* | (2006.01) |
| *B32B 27/32* | (2006.01) |
| *C08J 5/18* | (2006.01) |

(52) U.S. Cl.
CPC ........ *C08F 210/16* (2013.01); *B29C 48/0018* (2019.02); *B29C 48/08* (2019.02); *B29C 55/143* (2013.01); *B32B 27/32* (2013.01); *C08J 5/18* (2013.01); B29K 2023/06 (2013.01); B29K 2995/0053 (2013.01); B32B 2250/03 (2013.01); B32B 2307/518 (2013.01); C08J 2323/08 (2013.01)

(58) Field of Classification Search
CPC .................. C08F 210/16; C08F 210/14; C08F 2500/28; C08F 2500/37; C08F 2500/03; C08F 2500/04; B29C 48/0018; B29C 48/08; B29C 55/143; B29K 2023/06; B29K 2995/0053; B32B 2250/03; B32B 2307/518; B32B 27/32; C08J 2323/08; C08J 5/18

See application file for complete search history.

(56) References Cited

FOREIGN PATENT DOCUMENTS

| WO | 2015157939 A1 | 10/2015 |
|---|---|---|
| WO | 2017007640 A1 | 1/2017 |

OTHER PUBLICATIONS

International Search Report for International Application No. PCT/EP2019/067327, International Filing Date Jun. 28, 2019, dated Sep. 11, 2019, 5 pages.
Written Opinion for International Application No. PCT/EP2019/067327, International Filing Date Jun. 28, 2019, dated Sep. 11, 2019, 5 pages.

*Primary Examiner* — Lawrence D Ferguson
(74) *Attorney, Agent, or Firm* — Cantor Colburn LLP

(57) ABSTRACT

The present invention relates to a polymer comprising moieties derived from ethylene and moieties derived from 1-hexene, wherein the polymer has: (a) a density of $\geq 910$ and $\leq 930$ kg/m$^3$ as determined in accordance with ASTM D1505 (2010); (b) a melt mass-flow rate of $\geq 0.5$ and $\leq 5.0$ g/10 min, as determined in accordance with ASTM D1238 (2013) at a temperature of 190° C. under a load of 2.16 kg; (c) a fraction that is not eluted in analytical temperature rising elution fractionation (a-TREF) at a temperature >30.0° C. of $\geq 8.0$ wt %, with regard to the total weight of the polymer; and (d) a fraction eluted in a-TREF at a temperature >94.0° C. of $\geq 20.0$ wt %, with regard to the total weight of the polymer. Such polymer allows for the production of bi-directionally oriented films having a particularly desirable ability to be stretched at a high stretching ratio, in both the machine direction and in the transverse direction, and particularly to be stretched to a high stretching ratio in the machine direction and the transverse direction combined. Further this polymer allows for production of bi-directionally oriented films within a particularly and desirably broad temperature range in which the stretching can be performed without imparting any deficiencies of hampering the film production processes in continuous film production.

16 Claims, No Drawings

POLYMER FOR PRODUCTION OF BI-DIRECTIONALLY ORIENTED FILMS

CROSS REFERENCE TO RELATED APPLICATIONS

This application is a National Stage application of PCT/EP2019/067327, filed Jun. 28, 2019, which claims the benefit of European Application No. 18181656.2, filed Jul. 4, 2018, both of which are incorporated by reference in their entirety herein.

BACKGROUND

The present invention relates to a polymer for the production of bi-directionally oriented films. In particular, the invention relates to a polymer comprising moieties derived from ethylene and 1-hexene. The invention also relates to a process for production of bi-directionally oriented films, and to bi-directionally oriented films comprising the polymer.

Bi-directionally oriented films are commonly used materials, for example in a variety of packaging applications. Bi-directionally oriented films are particularly suitable in packaging applications due to their advantageous printing, laminating and sealing properties, and their advantageous mechanical performance at low temperatures.

A commonly used material in the field of packaging is polyethylene. Polyethylene has particularly desirable properties in that it is amongst others chemically inert, processable into a wide variety of shapes, and contributes to retaining quality of products packaged, such as for example foodstuffs.

However, the prior art does as yet not provide for a technology allowing for the production of bi-directionally oriented films of polyethylene with sufficient degree of drawing, in particular allowing for such films to be produced on a commercial scale, which includes high-speed production of films of large dimensions, such as films of over 6 m. width. There is a need for polyethylene materials for production of such films, as well as for processes for producing them.

SUMMARY

The present invention now provides such by a polymer comprising moieties derived from ethylene and moieties derived from 1-hexene, wherein the polymer has:
(a) a density of ≥910 and ≤930 kg/m³, preferably ≥916 and ≤925 kg/m³, as determined in accordance with ASTM D792 (2008);
(b) a melt mass-flow rate of ≥0.2, preferably ≥0.5 or ≥0.6, and ≤5.0 g/10 min, as determined in accordance with ASTM D1238 (2013) at a temperature of 190° C. under a load of 2.16 kg;
(c) a fraction that is eluted in analytical temperature rising elution fractionation (a-TREF) at a temperature ≤30.0° C. of ≥8.0 wt %, preferably ≥11.0 wt %, with regard to the total weight of the polymer; and
(d) a fraction eluted in a-TREF at a temperature >94.0° C. of ≥20.0 wt %, with regard to the total weight of the polymer; and preferably
(e) a fraction eluted in a-TREF at a temperature >30.0° C. and ≤94.0° C. of ≥40.0 and ≤64.0 wt %, with regard to the total weight of the polymer.

Such polymer allows for the production of bi-directionally oriented films having a particularly desirable ability to be stretched at a high stretching ratio, in both the machine direction and in the transverse direction, and particularly to be stretched to a high stretching ratio in the machine direction and the transverse direction combined. Further this polymer allows for production of bi-directionally oriented films within a particularly and desirably broad temperature range in which the stretching can be performed without imparting any deficiencies of hampering the film production processes in continuous film production.

DETAILED DESCRIPTION

In the context of the present invention, bi-directionally oriented films are to be understood to be films that have been produced by drawing a film both in the machine direction (MD), which is the direction in which the film is extruded from an extrusion process, and in the transverse direction (TD), which is the direction perpendicular to the MD in the plane of the film. Such drawing is to be applied at a drawing temperature of below the melting point of the film.

The polymer according to the present invention has a density of ≥910 and ≤930 kg/m³. Preferably, the polymer has a density of ≥910 and ≤925 kg/m³. More preferably, the polymer has a density of ≥915 and ≤925 kg/m³. Even more preferably, the polymer has a density of ≥916 and ≤925 kg/m³, or even more preferably ≥916 and ≤922 kg/m³.

The polymer according to the present invention has a melt mass-flow rate determined at 190° C. under a load of 2.16 kg, also referred to as MFR2, of ≥0.2 and ≤5.0 g/10 min, preferably ≥0.5 or ≥0.6, and ≤5.0 g/10 min, preferably ≥0.5 or ≥0.6, and ≤3.0 g/10 min, more preferably ≥0.8 and ≤3.0 g/10 min, even more preferably ≥1.0 and ≤3.0 g/10 min, even more preferably ≥1.0 and ≤2.5 g/10 min.

The polymer of the invention particularly is characterised by its a-TREF fingerprint, that is, it has a particular distribution of the fractions of polymer that in a-TREF are eluted in particular defined temperature ranges in which the fractionation is performed. In particular, the polymer according to the invention has a fraction eluted in a-TREF at a temperature >94.0° C. of ≥20.0 wt %, with regard to the total weight of the polymer. More preferably, the polymer has a fraction eluted >94.0° C. of ≥25.0 wt %, even more preferably ≥30.0 wt %, yet even more preferably ≥35.0 wt %.

In the field of polyethylenes, the fraction of polymer that is eluted in a-TREF at a temperature of >94.0° C. reflects the quantity of linear polymeric material that is present in the particular polymer. In the present polymer, having a particular quantity of the material in this fraction, this indicates that a certain amount of linear polymeric material is to be present.

Further, the polymer of the present invention has a fraction that is eluted in a-TREF at a temperature ≤30.0° C. of ≥8.0 wt %, with regard to the total weight of the polymer. The fraction that is eluted at a temperature of ≤30° C. may in the context of the present invention be calculated by subtracting the sum of the fraction eluted >94° C. and the fraction eluted >30° C. and ≤94° C. from 100%, thus the total of the fraction eluted ≤30° C., the fraction eluted >30° C. and ≤94° C. and the fraction eluted >94° C. to add up to 100.0 wt %. The fraction eluted ≤30° C. preferably is ≥9.0 wt %, more preferably ≥10.0 wt %, even more preferably ≥11.0 wt %.

Preferably, the fraction that is eluted in a-TREF at a temperature ≤30.0° C. is ≥8.0 and ≤16.0 wt %, more preferably ≥9.0 and ≤14.0 wt %, even more preferably ≥10.0 and ≤14.0 wt % with regard to the total weight of the polymer; and/or preferably, the fraction that is eluted in a-TREF at a temperature >94.0° C. is ≥20.0 and ≤50.0 wt %, more preferably ≥25.0 and ≤45.0 wt %, even more preferably ≥30.0 and ≤40.0 wt %, with regard to the total weight of the polymer; and/or preferably, the fraction that is eluted in a-TREF at a temperature >30.0° C. and ≤94.0° C. is ≥40.0 and ≤64.0 wt %, more preferably ≥45.0 and ≤60.0 wt %, even more preferably is ≥45.0 and ≤55.0 wt %.

it is preferred that the weight fraction that is eluted in a-TREF at a temperature of >30.0° C. and ≤94.0° C. is greater than the weight fraction that is eluted in a-TREF at a temperature of >94.0° C. Preferably, the fraction eluted >30.0° C. and ≤94.0° C. is at least 5.0 wt % greater than the fraction eluted >94.0° C., wherein the fractions are expressed with regard to the total weight of the polymer.

According to the invention, analytical temperature rising elution fractionation, also referred to as a-TREF, may be carried out using a Polymer Char Crystaf-TREF 300 with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution was performed with a heating rate of 1° C./min from 30° C. to 140° C. The set-up was cleaned at 150° C.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and optionally further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

The polymer according to the present invention may for example be a linear low-density polyethylene. For example, the polymer may be a linear low-density polyethylene produced using a Ziegler-Natta type catalyst.

The polymer according to the present invention may for example be produced using a gas-phase polymerisation process, using a slurry-phase polymerisation process, or using a solution polymerisation process.

The polymer according to the present invention may for example comprise ≥80.0 wt % of moieties derived from ethylene and/or ≥5.0 wt % and <20.0 wt % of moieties derived from 1-hexene, with regard to the total weight of the polymer. Preferably, the polymer comprises ≥85.0 wt % of moieties derived from ethylene, more preferably ≥88.0 wt %. Preferably, the polymer comprises ≥80.0 wt % and ≤99.0 wt % of moieties derived from ethylene, more preferably ≥85.0 wt % and ≤95.0 wt %, even more preferably ≥88.0 wt % and ≤93.0 wt %.

The polymer according to the present invention may for example comprise ≥5.0 wt %, preferably ≥7.0, wt %, more preferably ≥8.0 wt %, even more preferably ≥9.0 wt %, of moieties derived from 1-hexene, with regard to the total weight of the polymer. Preferably, the polymer comprises moieties derived from ethylene and ≥5.0 wt %, preferably ≥7.0, wt %, more preferably ≥8.0 wt %, even more preferably ≥9.0 wt %, of moieties derived from 1-hexene. More preferably, the polymer comprises moieties derived from ethylene and ≥5.0 wt % and ≤20.0 wt %, preferably ≥7.0, wt % and ≤17.0 wt %, more preferably ≥8.0 wt % and ≤15.0 wt %, even more preferably ≥9.0 wt % and ≤13.0 wt %, of moieties derived from 1-hexene.

For example, the polymer may comprise ≥80.0 wt % of moieties derived from ethylene and ≥5.0 wt %, preferably ≥7.0, wt %, more preferably ≥8.0 wt %, even more preferably ≥9.0 wt %, of moieties derived from 1-hexene. Preferably, the polymer comprises ≥80.0 wt % of moieties derived from ethylene and ≥5.0 wt % and ≤20.0 wt %, preferably ≥7.0, wt % and ≤17.0 wt %, more preferably ≥8.0 wt % and ≤15.0 wt %, even more preferably ≥9.0 wt % and ≤13.0 wt %, of moieties derived from 1-hexene.

In a certain embodiment, the polymer of the present invention consists of moieties derived from ethylene and moieties derived from 1-hexene. For example, the polymer may consist of moieties derived from ethylene and ≥5.0 wt %, preferably ≥7.0, wt %, more preferably ≥8.0 wt %, even more preferably ≥9.0 wt %, of moieties derived from 1-hexene. Preferably, the polymer consists of moieties derived from ethylene and ≥5.0 wt % and ≤20.0 wt %, preferably ≥7.0, wt % and ≤17.0 wt %, more preferably ≥8.0 wt % and ≤15.0 wt %, even more preferably ≥9.0 wt % and ≤13.0 wt %, of moieties derived from 1-hexene.

It is in certain embodiments of the present invention preferred that the polymer has a particular degree of long-chain branching. Long-chain branching, in the context of the present invention, is to be understood to reflect the presence of certain polymeric side chains that do not originate from incorporation of comonomers, but may for example be caused by reaction of polymeric chains comprising unsaturations with a further growing chain at a catalytic site. In certain embodiments, a certain presence of such long-chain branching is desirable. An indicator for the presence of long-chain branching, in the context of the present invention, may for example be the storage modulus G' at certain loss modulus G". A certain high storage modulus at defined loss modulus indicates the presence of a certain quantity of long-chain branching in the polymer. Particularly preferred indicators for the presence of a certain degree of long-chain branching are the storage modulus at loss modulus of 10.0 kPa, and the storage modulus at loss modulus of 1.0 kPa. The storage modulus and the loss modulus may for example be determined in accordance with ISO 6721-10 (2015).

For example, the polymer may have a storage modulus determined at loss modulus of 10.0 kPa of >2.0 kPa, preferably >2.2 kPa, more preferably >2.5 kPa. For example, the polymer may have a storage modulus determined at loss modulus of 1.0 kPa of >50 Pa, preferably >75 Pa, more preferably >100 Pa. For example, the polymer may have a storage modulus determined at loss modulus of 1.0 kPa of >50 Pa, preferably >75 Pa, more preferably >100 Pa, and <150 Pa. For example, the storage modulus at loss modulus of 10.0 kPa may be >2.0 kPa and the storage modulus at loss modulus of 1.0 kPa may be >50 Pa, preferably the storage modulus at loss modulus of 10.0 kPa is >2.5 kPa and the storage modulus at loss modulus of 1.0 kPa is >50 and <150 Pa.

The polymer may for example comprise <250, preferably <200, or >100 and <250, unsaturations per 1000000 chain carbon atoms, wherein the unsaturations are determined as the sum of the vinyl unsaturations, vinylene unsaturations, vinylidene unsaturations, and triakyl unsaturations, determined via $^{13}C$ NMR. The number of unsaturations may be measured by $^{13}C$ NMR on a Bruker Avance 500 spectrometer equipped with a cryogenically cooled probe head operating at 125° C., whereby the samples are dissolved at 130° C. in $C_2D_2Cl_4$ containing DBPC as stabiliser.

The polymer may for example have an $M_w/M_n$ ratio of >4.0, preferably >4.0 and <10.0, more preferably >5.0 and <8.0. For example, the polymer may have an $M_z/M_n$ ratio of >15.0, preferably >15.0 and <40.0, preferably >20.0 and <30.0, wherein $M_n$ is the number average molecular weight, $M_w$ is the weight average molecular weight, and $M_z$ is the z-average molecular weight, as determined in accordance with ASTM D6474 (2012). For example, the polymer may for example have an $M_w/M_n$ ratio of >4.0, preferably >4.0 and <10.0 and an $M_z/M_n$ ratio of >15.0, preferably >15.0 and <40.0.

It is preferred that for the polymer according to the present invention, in the range of $\log(M_w)$ between 4.0 and 5.5, the slope of the curve of the number of $CH_3$ branches per 1000 C atoms versus the $\log(M_w)$ is negative, wherein the number of $CH_3$ branches is determined via SEC-DV with and IR5 infrared detector, in accordance with ASTM D6474 (2012).

The polymer may have an $M_w$ of for example >75 kg/mol, preferably >100 kg/mol, such as >75 and <200 kg/mol, preferably >100 and <150 kg/mol. The polymer may have an $M_n$ of for example >15 kg/mol, preferably >20 kg/mol, such as for example >15 and <40 kg/mol, preferably >20 and <30 kg/mol. The polymer may have an $M_z$ of >300 kg/mol, preferably >400 kg/mol, such as >300 and <700 kg/mol, preferably >400 and <650 kg/mol. Such characteristics of $M_w$, $M_z$ and/or $M_n$ may contribute to the improved stretchability of the film produced using the polymer of the invention.

In a certain embodiment, the invention also relates to a polymer comprising moieties derived from ethylene and moieties derived from 1-hexene, wherein the polymer has:
  (a) a density of ≥916 and ≤925 kg/m³ as determined in accordance with ASTM D792 (2008);
  (b) a melt mass-flow rate of ≥0.6 and ≤5.0 g/10 min, as determined in accordance with ASTM D1238 (2013) at a temperature of 190° C. under a load of 2.16 kg;
  (c) a fraction that is eluted in analytical temperature rising elution fractionation (a-TREF) at a temperature ≤30.0° C. of ≥11.0 wt %, with regard to the total weight of the polymer; and
  (d) a fraction eluted in a-TREF at a temperature >94.0° C. of ≥20.0 wt %, with regard to the total weight of the polymer; and
  (e) a fraction eluted in a-TREF at a temperature >30.0° C. and ≤94.0° C. of ≥40.0 and ≤64.0 wt %, with regard to the total weight of the polymer.

In certain of its embodiments, the invention also relates to a process for the production of a bi-directionally oriented film comprising the polymer according to the invention.

The invention also relates in one of its embodiments to a process for the production of a bi-directionally oriented film, comprising the steps in this order of:
  providing a polymer according to the invention;
  converting the polymer to a melt using a melt extruder;
  extruding the molten polymer and solidifying the polymer to form a cast film;
  subjecting the cast film to heat to bring the film to a temperature of >70° C. and <$T_{pm}$, $T_{pm}$ being determined as peak melting temperature in accordance with ASTM D3418 (2008);
  stretching the heated cast film by:
    applying a stretching force in the machine direction (MD) to induce a drawing in the machine direction, and subsequently subjecting the obtained film to heat to bring the film to a temperature of between $T_{pm}$-25° C. and $T_{pm}$ under application of a stretching force in the transverse direction (TD) to induce a drawing in the transverse direction;
  or
    simultaneously applying a stretching force in the MD and the TD to induce a drawing in the MD and the TD;
  maintaining the stretching forces and temperature to ensure drawing in TD is maintained to a level of >85% of the drawing in TD as applied; and
  releasing the stretch force and cooling the stretched films to obtain a bi-directionally oriented film; and optionally
  subjecting the bi-directionally oriented film to a surface treatment, preferably a corona treatment, to increase the hydrophilicity of the surface.

Particularly, the invention also relates to a process for the production of a bi-directionally oriented film, comprising the steps in this order of:
  providing a polymer according to the invention;
  converting the polymer to a melt using a melt extruder;
  extruding the molten polymer and solidifying the polymer to form a cast film;
  subjecting the cast film to heat to bring the film to a temperature of >70° C. and <$T_{pm}$, $T_{pm}$ being determined as peak melting temperature in accordance with ASTM D3418 (2008);
  stretching the heated cast film by:
    applying a stretching force in the machine direction (MD) to induce a drawing in the machine direction, and subsequently subjecting the obtained film to heat to bring the film to a temperature of between $T_{pm}$-25° C. and $T_{pm}$ under application of a stretching force in the transverse direction (TD) to induce a drawing in the transverse direction:
  maintaining the stretching forces and temperature to ensure drawing in TD is maintained to a level of >85% of the drawing in TD as applied; and
  releasing the stretch force and cooling the stretched films to obtain a bi-directionally oriented film; and optionally
  subjecting the bi-directionally oriented film to a surface treatment, preferably a corona treatment, to increase the hydrophilicity of the surface.

In a particular embodiment, the process involves orienting the unoriented film to a drawing ratio of >4.0 in the machine direction and/or >8.5 in the transverse direction, wherein orientation in the machine direction is to be understood to be the ratio of a length in the machine direction of a certain quantity of material after having been subjected to a stretching force in the machine direction to the length that that very same quantity of material had prior to having been subjected to that stretching force in the machine direction, and orientation or stretch in the transverse direction is to be understood to be the ratio of the width of the film after having been subjected to a stretching force in the transverse direction to the width of the film prior to having been subjected to that stretching force in the transverse direction.

In certain further embodiments, the invention also relates to bi-directionally oriented films comprising the polymer of the present invention. The invention also relates to bi-directionally oriented films produced using the process as provided by the present invention. For example, such film may have a thickness of ≥2.0 and ≤200.0 μm, preferably between 2 and 100 μm, more preferably between 5 and 100 μm, more preferably between 5 and 50 μm.

For example, the invention also relates in a certain embodiment to a bi-directionally oriented film comprising a polymer comprising moieties derived from ethylene and moieties derived from 1-hexene, wherein the polymer has:
 (a) a density of ≥916 and ≤925 kg/m$^3$ as determined in accordance with ASTM D792 (2008);
 (b) a melt mass-flow rate of ≥0.6 and ≤5.0 g/10 min, as determined in accordance with ASTM D1238 (2013) at a temperature of 190° C. under a load of 2.16 kg;
 (c) a fraction that is eluted in analytical temperature rising elution fractionation (a-TREF) at a temperature ≤30.0° C. of ≥11.0 wt %, with regard to the total weight of the polymer; and
 (d) a fraction eluted in a-TREF at a temperature >94.0° C. of ≥20.0 wt %, with regard to the total weight of the polymer; and
 (e) a fraction eluted in a-TREF at a temperature >30.0° C. and ≤94.0° C. of ≥40.0 and ≤64.0 wt %, with regard to the total weight of the polymer.

The film may for example have an orientation in the machine direction of at least 4.0. In the context of the present invention, orientation may also be referred to as stretch. Orientation in the machine direction is to be understood to be the ratio of a the length in the machine direction of a certain quantity of material after having been subjected to a stretching force in the machine direction to the length that that very same quantity of material had prior to having been subjected to that stretching force in the machine direction.

The film may for example have an orientation in the transverse direction of at least 8.5. Orientation or stretch in the transverse direction is to be understood to be the ratio of the width of the film after having been subjected to a stretching force in the transverse direction to the width of the film prior to having been subjected to that stretching force in the transverse direction.

Stretching in the transverse direction may for example be achieved by clamping the film in clamps positioned on either side of the film at certain distance intervals, applying a certain heat to the film to ensure the film is at a certain temperature, and applying an amount of force onto the clamps outwards from the plane of the film in the transverse direction. Such stretching may for example be done in a continuous operation.

The bi-directionally oriented film may for example comprise >80.0 wt % of the polymer, preferably >85.0 wt %, preferably >90.0 wt %, for example >80.0 and <98.0 wt %, or >90.0 and <98.0 wt %, with regard to the total weight of the bi-directionally oriented film.

The bi-directionally oriented film may in certain embodiments also comprise additives. For example, the di-directionally oriented film may in certain embodiments comprise additives selected from UV stabilisers, antistatic agents, slip/anti-block agents, fillers, antioxidants, pigments, processing aids such as fluoroelastomers, and mixtures thereof. For example, the bi-directionally oriented film may comprise <20.0 wt %, preferably >0.0 and <20.0 wt %, preferably >0.0 and <10.0 wt %, more preferably >0.5 and <5.0 wt %, even more preferably >0.5 and <2.5 wt % of additives, with regard to the total weight of the bi-directionally oriented film. For example, the bi-directionally oriented film may comprise additives selected from erucamide, oleamide, silica, talc, and mixtures thereof. For example, the bi-directionally oriented film may comprise >0.0 and <5.0 wt %, more preferably >0.5 and <2.5 wt %, even more preferably >0.5 and <1.5 wt % of additives selected from erucamide, oleamide, silica, talc, and mixtures thereof. For example, the bi-directionally oriented film may comprise >0.0 and <20.0 wt %, more preferably >0.5 and <10.0 wt %, even more preferably >0.5 and <5.0 wt % of titanium oxide, or >5.0 and <15.0 wt %, preferably >6.0 and <12.0 wt %.

The bi-directionally oriented film may for example comprise a quantity of an anti-fog agent. For example, the film may comprise >0.1 and <3.0 wt %, or >0.5 and <2.0 wt %, of an anti-fog agent, with regard to the total weight of the film.

In a certain embodiment, the film may have a wetting tension as determined in accordance with ASTM D2578 (2009) of ≥35 mN/m.

The invention relates in a certain embodiment to a bi-directionally oriented film consisting of a single layer. This may allow for the production of a film in a very simple films arrangement.

The invention also relates to a multi-layer structure comprising at least one layer comprising the bi-directionally oriented film. The invention also relates to an embodiment wherein the multi-layer structure comprises at least one layer consisting of the bi-directionally oriented film. For example, such multi-layer structure may comprise exactly one layer comprising the bi-directionally oriented film. For example, the multi-layer structure may comprise exactly one layer consisting of the bi-directionally oriented film In a particular embodiment, the invention relates to a multi-layer film structure consisting of 3, 5, 7, 9, or 11 layers, comprising at least one layer consisting of the bi-directionally oriented film. For example, the multi-layer structure may consist of 3 layers, comprising at least one layer consisting of the bi-directionally oriented film. For example, the multi-layer structure may consist of 5 layers, comprising at least one layer consisting of the bi-directionally oriented film.

The multi-layer structure may for example consist of 3 or 5 layers, comprising at least one layer consisting of the bi-directionally oriented film. Preferably, the multi-layer structure consists of 3 or 5 layers, wherein at least one of the inner layers consists of the bi-directionally oriented film. In particular, the invention relates to an embodiment of a multi-layer structure consisting of 3 or 5 layers, wherein at least one of the inner layers consists in the bi-directionally oriented film, wherein the bi-directionally oriented film comprises >80.0 wt % of the polymer, preferably consists of the polymer, wherein the polymer comprises moieties derived from ethylene and moieties derived from 1-hexene, wherein the polymer has:
 (a) a density of ≥910 and ≤930 kg/m$^3$, preferably of ≥916 and ≤925 kg/m$^3$, as determined in accordance with ASTM D792 (2008);
 (b) a melt mass-flow rate of ≥0.2, preferably ≥0.6, and ≤5.0 g/10 min, as determined in accordance with ASTM D1238 (2013) at a temperature of 190° C. under a load of 2.16 kg;
 (c) a fraction that is eluted in analytical temperature rising elution fractionation (a-TREF) at a temperature ≤30.0° C. of ≥8.0 wt %, preferably ≥11.0 wt %, with regard to the total weight of the polymer; and
 (d) a fraction eluted in a-TREF at a temperature >94.0° C. of ≥20.0 wt %, with regard to the total weight of the polymer; and preferably
 (e) a fraction eluted in a-TREF at a temperature >30.0° C. and ≤94.0° C. of ≥40.0 and ≤64.0 wt %, with regard to the total weight of the polymer.

More particularly, the invention relates to an embodiment of a multi-layer structure consisting of 3 or 5 layers, wherein at least one of the inner layers consists in the bi-directionally oriented film, wherein the bi-directionally oriented film comprises >80.0 wt % of the polymer, preferably consists of the polymer, wherein the polymer comprises ≥80.0 wt % of moieties derived from ethylene and <20.0 wt % of moieties derived from 1-hexene, with regard to the total weight of the polymer, wherein the polymer has:
- (a) a density of ≥910 and ≤930 kg/m³, preferably of ≥916 and ≤925 kg/m³, as determined in accordance with ASTM D792 (2008);
- (b) a melt mass-flow rate of ≥0.2, preferably ≥0.6, and ≤5.0 g/10 min, as determined in accordance with ASTM D1238 (2013) at a temperature of 190° C. under a load of 2.16 kg;
- (c) a fraction that is eluted in analytical temperature rising elution fractionation (a-TREF) at a temperature ≤30.0° C. of ≥8.0 wt %, preferably ≥11.0 wt %, with regard to the total weight of the polymer; and
- (d) a fraction eluted in a-TREF at a temperature >94.0° C. of ≥20.0 wt %, with regard to the total weight of the polymer; and preferably
- (e) a fraction eluted in a-TREF at a temperature >30.0° C. and ≤94.0° C. of ≥40.0 and ≤64.0 wt %, with regard to the total weight of the polymer.

The films can be subjected to a surface treatment such as a corona treatment or a flame treatment on order to increase the hydrophilicity of the surface. The hydrophilicity may be determined as the wetting tension in accordance with ASTM 02578 (2009), expressed in mN/in.

The invention will now be illustrated by the following non-limiting examples.

| Polymer materials | | | | |
|---|---|---|---|---|
| Polymer | PE-1 | PE-2 | PE-3 | PE-4 |
| MFR2 | 0.86 | 2.14 | 1.10 | 0.95 |
| Density | 920 | 921 | 915 | 919 |
| Ethylene units content | 89.3 | 89.0 | 89.0 | 91.1 |
| Comonomer units content | 10.7 | 11.0 | 11.0 | 8.9 |
| Comonomer type | C6 | C6 | C8 | C6 |
| Comonomer branch content | 17.8 | 18.4 | 14.9 | 13.5 |
| $M_n$ | 27 | 18 | 27 | 37 |
| $M_w$ | 145 | 115 | 71 | 130 |
| $M_z$ | 540 | 450 | 165 | 350 |
| $M_w/M_n$ | 5.5 | 6.3 | 2.6 | 3.6 |
| $M_z/M_w$ | 3.7 | 3.9 | 2.3 | 2.7 |
| $M_z/M_n$ | 20.4 | 25.4 | 6.1 | 9.5 |
| a-TREF < 30 | 11.8 | 13.5 | 0.5 | 4.3 |
| a-TREF 30-94 | 49.8 | 50.9 | 99.5 | 65.9 |
| a-TREF > 94 | 38.4 | 35.6 | 0.0 | 29.8 |
| Unsaturations | 160 | 160 | 210 | 270 |
| Storage modulus at loss modulus of 10.0 kPa | 3000 | 3000 | | 1500 |
| Storage modulus at loss modulus of 1.0 kPa | 110 | 100 | | 35 |

Wherein:
the MFR2 is the melt mass flow rate as determined in accordance with ASTM 01238 (2013) at a temperature of 190° C. under a load of 2.16 kg, expressed in g/10 min;
the density is determined in accordance with ASTM D792 (2008), expressed in kg/m³;
the ethylene units content indicates the weight quantity of units present in the polymer that are derived from ethylene, also referred to as the quantity of moieties derived from ethylene, with regard to the total weight of the polymer, expressed in wt %;
the comonomer content indicates the weight quantity of units present in the polymer that are derived from the comonomer, also referred to as the quantity of moieties derived from the comonomer, with regard to the total weight of the polymer, expressed in wt %;
the comonomer type indicates the type of comonomer used in the production of the polymer, where C6 is 1-hexene and C8 is 1-octene;
the comonomer branch content indicates the number of branches per 100 carbon atoms in the polymer, as determined via $^{13}$C-NMR;
$M_n$ is the number average molecular weight, $M_w$ is the weight average molecular weight, and $M_z$ is the z-average molecular weight, wherein $M_n$, $M_w$, and $M_z$ are each expressed in kg/mol, and determined in accordance with ASTM D6474 (2012);
a-TREF <30 indicates the fraction of the polymer that is eluted in a-TREF according to the method presented above in the temperature range ≤30.0° C., expressed in wt %, and represents the amorphous fraction of the polymer, calculated by subtracting the a-TREF 30-94 and the a-TREF >94 fraction from 100.0 wt %;
a-TREF 30-94 indicates the fraction of the polymer that is eluted in a-TREF in the temperature range of >30.0 and ≤94.0° C., expressed in wt %, and represents the branched fraction of the polymer;
a-TREF >94 indicates the fraction of the polymer that is eluted in a-TREF in the temperature range of >94.0 and <140° C., expressed in wt %, and represents the linear fraction of the polymer;
the unsaturations indicate the sum of vinyl unsaturations, vinylene unsaturations, vinylidene unsaturations, triakyl unsaturations, and expressed in number of unsaturations per 1000000 chain carbon atoms, and are determined by $^{13}$C NMR on a Bruker Avance 500 spectrometer equipped with a cryogenically cooled probe head operating at 125° C., whereby the samples are dissolved at 130° C. in $C_2D_2Cl_4$ containing DBPC as stabiliser
the storage modulus and the loss modulus are determined using dynamical mechanical spectroscopy (DMS) frequency sweep measurements according to ISO 6721-10 at a temperature of 190° C. in a nitrogen environment using a parallel plate set-up, using a frequency range of 0.1-100 rad/s, at oscillation strain of 5%, and are expressed in Pa.

For the polymer samples, the quantity of $CH_3$ branches per 1000 C atoms was determined via SEC-DV with and IR5 infrared detector, in accordance with ASTM D6474 (2012), for a range of different $M_w$'s, as represented in the table below.

| | Number of $CH_3$ branches per 1000 C | | | |
|---|---|---|---|---|
| Log $M_w$ | PE-1 | PE-2 | PE-3 | PE-4 |
| 4.0 | 20.8 | 21.5 | 13.1 | 12.7 |
| 4.5 | 19.3 | 19.5 | 14.3 | 12.9 |
| 5.0 | 16.8 | 17.1 | 15.3 | 13.3 |
| 5.5 | 13.8 | 14.0 | 16.0 | 14.2 |

The above results show that the polymers of the present invention demonstrate a reduced $CH_3$ branch content with increase of the $M_w$.

Using the above polymers, unoriented sheets of 90×90 mm, thickness 0.5 mm, were prepared using a twin-screw extruder having a length over diameter ratio of 42, at a temperature of the melt of 220° C., with a throughput of 16 kg/h. A KARO IV sheet stretching machine, obtainable from Brückner Maschinenbau, was used to stretch the sheets, in both simultaneous and sequential operation. The drawing speed was 100%/s, and the drawing temperature 4° C. below the peak melting temperature. All test specimens were pre-heated for 30 s before stretching force was applied. The draw ratio was monitored during the bi-directional stretching process. After drawing, the samples were removed from the machine after cooling under tension.

| Experiment | 1 | 2 | 3 | 4 | 5 | 6 | 7 | 8 |
|---|---|---|---|---|---|---|---|---|
| Polymer | PE-1 | | PE-2 | | PE-3 | | PE-4 | |
| Peak melting temperature | 124 | | 124 | | 112 | | 122 | |
| Type of drawing | Sim | Seq | Sim | Seq | Sim | Seq | Sim | Seq |
| Drawing temp | 120 | 120 | 120 | 120 | 108 | 108 | 118 | 118 |
| Max drawing MD | 7.5 | 5.0 | 7.8 | 5.0 | 5.0 | 3.5 | 6.5 | 5.0 |
| Max drawing TD | 7.5 | 10 | 7.8 | 10 | 5.0 | 5.3 | 6.5 | 7.0 |
| MD × TD | 56 | 50 | 63 | 50 | 25 | 18 | 42 | 35 |

Wherein
Peak melting temperature is determined using differential scanning calorimetry according to ASTM D3418 (2008), expressed in ° C.
Type of drawing: Sim means simultaneous drawing in MD and TD direction, Seq means first drawing applied in MD, subsequently in TD.
Drawing temp: temperature of film during drawing process, in ° C.
Max drawing MD: the drawing ratio applied in the machine direction, calculated as the ratio of the length in MD after drawing to the length in MD prior to drawing.
Max drawing TD: the maximum achievable drawing ratio in transverse direction without the film breaking, calculated at the ratio of the length in TD after drawing to the length in TD prior to drawing.
MD×TD is the max drawing MD multiplied by the max drawing TD.

The above results indicate that polymers according to the present invention, as reflected by examples 1-4, allow for the production of bi-directionally oriented films with an improved drawing ratio when compared to polymers according to the art, as reflected by examples 5-8. An MD×TD of more than 35 allows for an economically feasible production of bi-directionally oriented polyethylene films on a tenter frame film production line.

Of the films that were produced via sequential stretching, tensile modulus properties were determined as presented in the table below, in accordance with ASTM D882 (2012), at a temperature of 23° C., rel. humidity 50%, using 25 mm width strips, initial grip distance 250 mm, test speed 25 mm/min.

| Example | 2 | 4 | 6 | 8 |
|---|---|---|---|---|
| Tensile modulus in MD | 666 | 707 | 384 | 220 |
| Tensile modulus in TD | 1350 | 1316 | 391 | 209 |

The above shows that bi-directionally oriented films produced using polymers according to the present invention demonstrate an improved tensile modulus in both directions vis-à-vis polymers of the art. So not only can a film with a higher degree of drawing be obtained according to the present invention, that film further also has a higher tensile modulus.

The invention claimed is:
1. Polymer comprising moieties derived from ethylene and moieties derived from 1-hexene, wherein the polymer has:
(a) a density of ≥910 and ≤930 kg/m$^3$, as determined in accordance with ASTM D792 (2008);
(b) a melt mass-flow rate of ≥0.2 and ≤5.0 g/10 min, as determined in accordance with ASTM D1238 (2013) at a temperature of 190° C. under a load of 2.16 kg;
(c) a fraction that is eluted in analytical temperature rising elution fractionation (a-TREF) at a temperature ≤30.0° C. of ≥8.0 wt %, with regard to the total weight of the polymer; and
(d) a fraction eluted in a-TREF at a temperature >94.0° C. of ≥20.0 wt %, with regard to the total weight of the polymer,
wherein the polymer comprises ≥80.0 wt % of moieties derived from ethylene and/or ≥5.0 wt % and <20.0 wt % of moieties derived from 1-hexene, with regard to the total weight of the polymer.
2. Polymer according to claim 1, wherein:
the fraction (c) that is eluted in a-TREF at a temperature ≤30.0° C. is ≥8.0 and ≤16.0 wt %, with regard to the total weight of the polymer; and/or
the fraction (d) that is eluted in a-TREF at a temperature >94.0° C. is ≥20.0 and ≤50.0 wt %, with regard to the total weight of the polymer; and/or
the fraction that is eluted in a-TREF at a temperature >30.0 and ≤94.0° C. is ≥40.0 and ≤64.0 wt %.
3. Polymer according to claim 1, wherein the polymer has:
a storage modulus determined at loss modulus of 10.0 kPa of >2.0 kPa; and/or
a storage modulus determined at loss modulus of 1.0 kPa of >50 Pa;
wherein the storage modulus and the loss modulus are determined in accordance with ISO 6721-10 (2015), at a temperature of 190° C.
4. Polymer according to claim 1, wherein the polymer has an $M_w/M_n$ ratio of >4.0, and/or wherein the polymer has an $M_z/M_n$ ratio of >15.0, wherein $M_n$ is the number average molecular weight, $M_w$ is the weight average molecular weight, and $M_z$ is the z-average molecular weight, as determined in accordance with ASTM D6474 (2012).
5. Polymer according to claim 1, wherein the polymer comprises <150 unsaturations per 1000 chain carbon atoms, wherein the unsaturations are determined as the sum of the vinyl unsaturations, vinylene unsaturations, vinylidene unsaturations, and triakyl unsaturations, determined via $^{13}$C NMR, and/or wherein in the range of log($M_w$) between 4.0 and 5.5, the slope of the curve of the number of $CH_3$ branches per 1000 C atoms versus the log($M_w$) is negative, wherein the number of $CH_3$ branches is determined via SEC-DV with and IR5 infrared detector, in accordance with ASTM D6474 (2012).
6. Process for the production of a bi-directionally oriented film comprising extruding a polymer according to claim 1.
7. Process for the production of a bi-directionally oriented film according to claim 6, comprising the steps in this order of:
providing the polymer;
converting the polymer to a melt using a melt extruder;
extruding the molten polymer and solidifying the polymer to form a cast film;

subjecting the cast film to heat to bring the film to a temperature of >70° C. and <$T_{pm}$, $T_{pm}$ being determined as peak melting temperature in accordance with ASTM D3418 (2008);
stretching the heated cast film by:
applying a stretching force in the machine direction (MD) to induce a drawing in the machine direction, and subsequently subjecting the obtained film to heat to bring the film to a temperature of between $T_{pm}$-25° C. and $T_{pm}$ under application of a stretching force in the transverse direction (TD) to induce a drawing in the transverse direction;
or
simultaneously applying a stretching force in the MD and the TD to induce a drawing in the MD and the TD;
maintaining the stretching forces and temperature to ensure drawing in TD is maintained to a level of >85% of the drawing in TD as applied; and
releasing the stretch force and cooling the stretched films to obtain a bi-directionally oriented film; and optionally
subjecting the bi-directionally oriented film to a surface treatment, to increase the hydrophilicity of the surface.

8. Process according to claim 6, wherein the unoriented film is oriented to a drawing ratio of >4.0 in the machine direction and/or >8.5 in the transverse direction, wherein orientation in the machine direction is to be understood to be the ratio of a the length in the machine direction of a certain quantity of material after having been subjected to a stretching force in the machine direction to the length that that very same quantity of material had prior to having been subjected to that stretching force in the machine direction, and orientation or stretch in the transverse direction is to be understood to be the ratio of the width of the film after having been subjected to a stretching force in the transverse direction to the width of the film prior to having been subjected to that stretching force in the transverse direction.

9. Bi-directionally oriented film comprising the polymer according to claim 1.

10. Bi-directionally oriented film produced according to the process of claim 7.

11. Bi-directionally oriented film according to claim 9, wherein the film has a thickness of ≥2.0 and ≥200.0 µm.

12. Bi-directionally oriented film according to claim 9, wherein the film has a wetting tension as determined in accordance with ASTM D2578 (2009) of ≥35 mN/m.

13. Multi-layer structure comprising at least one layer consisting of the bi-directionally oriented film of claim 9.

14. Multi-layer structure according to claim 13 comprising at least three layers or consisting of three layers, wherein at least one of the inner layers of the structure consists of the bi-directionally oriented film.

15. Polymer according to claim 1, wherein the polymer has:
a density of ≥916 and ≤925 kg/m$^3$, as determined in accordance with ASTM D792 (2008);
a melt mass-flow rate of ≥0.5 and ≤5.0 g/10 min, as determined in accordance with ASTM D1238 (2013) at a temperature of 190° C. under a load of 2.16 kg;
a fraction that is eluted in analytical temperature rising elution fractionation (a-TREF) at a temperature ≤30.0° C. of ≥11.0 wt %, with regard to the total weight of the polymer; and
a fraction eluted in a-TREF at a temperature >30.0° C. and ≤94.0° C. of ≥40.0 and ≤64.0 wt %, with regard to the total weight of the polymer.

16. Polymer according to claim 1, wherein the polymer has an $M_w/M_n$ ratio of >4.0 and <10.0, and/or wherein the polymer has an $M_z/M_n$ ratio of >15.0 and <40.0, wherein $M_n$ is the number average molecular weight, $M_w$ is the weight average molecular weight, and $M_z$ is the z-average molecular weight, as determined in accordance with ASTM D6474 (2012).

* * * * *